Patented Jan. 13, 1925.

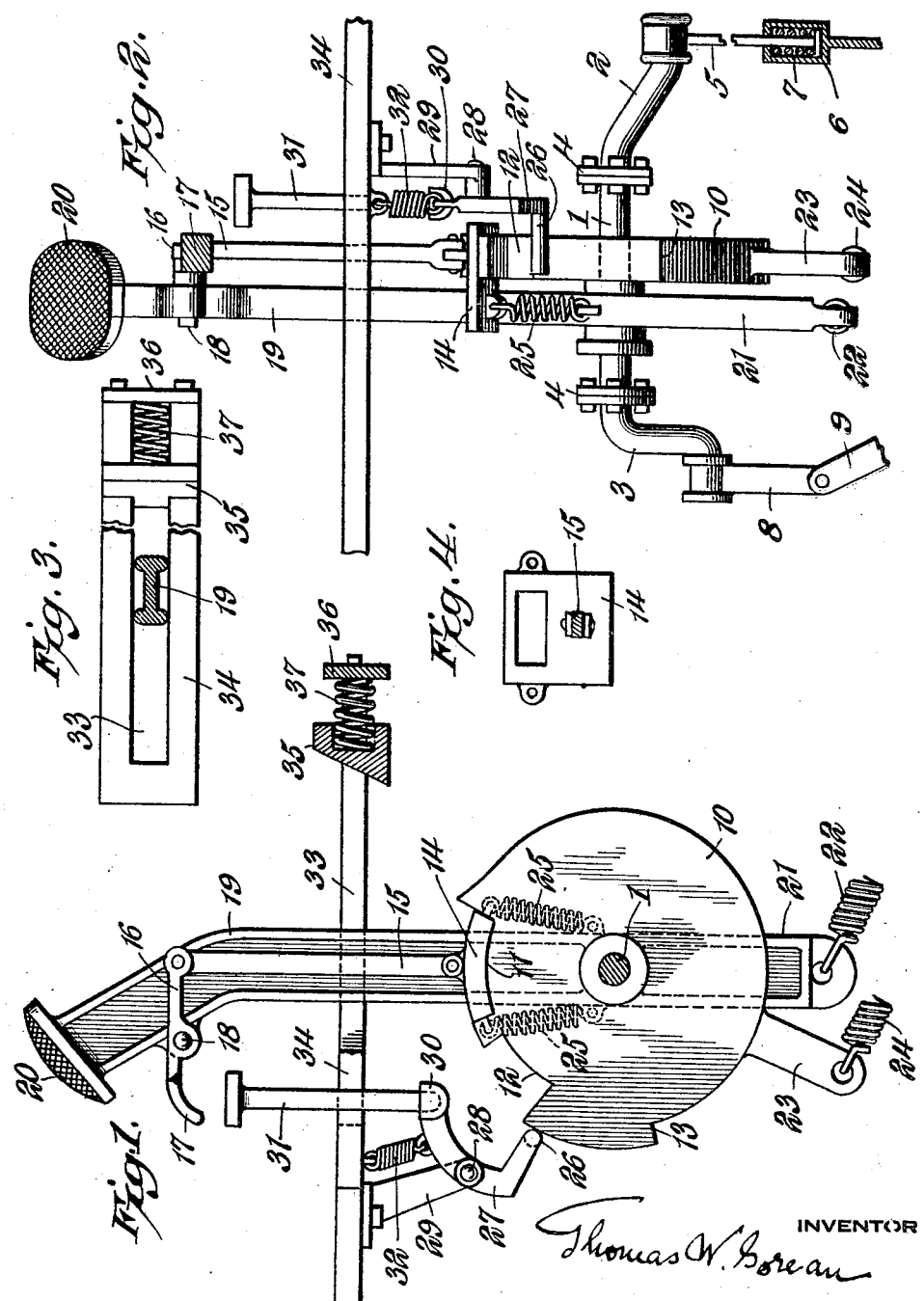

1,523,261

UNITED STATES PATENT OFFICE.

THOMAS W. GOREAU, OF DETROIT, MICHIGAN.

BRAKE MECHANISM.

Application filed June 2, 1924. Serial No. 717,409.

*To all whom it may concern:*

Be it known that I, THOMAS W. GOREAU, a citizen of the United States, residing at Detroit, in the county of Wayne and State of Michigan, have invented new and useful Improvements in Brake Mechanism, of which the following is a specification.

My present invention pertains to brake operating mechanism for motor vehicles and the like and it contemplates the provision of a device through the medium of which sudden stopping of a vehicle may be accomplished.

The invention further contemplates the provision of a foot brake that is adapted to serve all the purposes of a foot brake as well as the hand emergency brake now in general use.

The invention in all of its details will be fully understood from the following description and claims when the same are read in connection with the drawings accompanying and forming part of this specification, in which Figure 1 is a side elevation of my novel device and showing a portion thereof in section.

Figure 2 is a front elevation of my novel brake mechanism.

Figure 3 is a top plan view of the brake confining members of my invention.

Figure 4 is a detail view of a portion of the brake lever and showing the shoe thereof.

Similar numerals of reference designate corresponding parts in all the views of the drawings.

The axle 1 is provided with a disk 10 that is keyed or otherwise secured on the axle and is adapted to rotate the axle when pressure is applied at 20 on the lever 19.

Secured to the axle 1 by collar 4 is the general braking axle 2 that is off-set as illustrated and at 3 I provide another off-set axle that is secured to axle 1 by the collar 4. This axle 3 is the emergency axle and both the axles 2 and 3 may be secured to the axle 1 in any manner other than the collars 4 as may suggest itself.

Secured on the axle 2 is a bearing member 5 that is attached to end bearing of said axle and arranged on member 5 is a casing 6 that confines a spring 7 as shown. The member or rod 5 extends to any conventional braking mechanism.

By reference to Figures 1 and 2 it will be seen that when the general braking means 19 is at its extreme forward stroke and about to engage the emergency equipment the spring 7 will collapse so that additional travel of the disc 10 to engage the emergency slot 12 will not place excessive strain on the brake bands of the vehicle. Spring 7 is sufficiently strong to take care of general braking but will give in emergency braking when excess pressure is brought to bear at 20.

Connected to the bearing on the end of the axle 3 is a link 8 and this link is secured to the pivoted rod 9 that slides in the link 8. The free end of rod 9 is connected to the emergency mechanism of the vehicle.

The disk 10 is secured to the axle 1 in any approved manner and moves forward and backward by action of the pedal 20. The disk is returned to normal position by spring 24.

Arranged in the disc 10 is a slot or recess 11 that engages the shoe 14 as illustrated.

The travel of the shoe 14 is limited by the spring bumper 35 and arranged between the members 35 and 36 is a spring that is strong enough to prevent further travel of member 19 for other than normal braking. However, if emergency arises the excess pressure on the member 20 will force bumper 35 forward against spring 37 and hence against 36. This action causes disc 10 to move forward so that a dog 26 will engage the portion 13 of disc 10, and this holds disc 10 firmly. By pressing foot 17 of arm 16 the foot engages a pivoted member 16—18 and actuates shoe 14. The shoe 14 will be raised above the slots 11 and 12 of disc 10 and the spring 22 at the lower end of the member 21 brings the lever 19 over and backward so that shoe 14 drops into slot 12 and away from slot 11. If further pressure is placed on 20 the spring 37 collapses to allow sufficient travel to take care of emergency braking. When shoe 14 engages emergency space 12 foot pressure is exerted of sufficient force to force 35 backward and allows emergency brake to operate as well as throw off transmission power thereby removing power of the engine.

To return to general braking position after emergency has been applied, spring 22 assisted by spring 24 will return 19 to normal position as shown, by letting 20 gradually return backward and away from bumper 35 assisted by foot pressure and application of same. The dog 26 which has traveled from 13 to 23 during the emergency braking operation, will return to position 13 and engage same at this point. Lever 17 is then depressed, raising shoe 14 high enough to pass from slotted recess 12 into slotted recess 11, by moving 19 again toward bumpers 35 by foot pressure at 20 and coacting with spring 22. As 19 moves toward 35 shoe 14 drops into slotted position 11. Pivoted rod 31 is then depressed downward, moving dog 26 outward and away from position 13. Then 19 is allowed to return to normal position as shown, backward and away from bumper 35 by assistance of foot power pressure at 20. The member is again in position for general braking.

I would distinctly have it understood that the position of depressing member 31 may be located in the most convenient position for operation, but the present position is shown for the purpose of illustration only.

When the emergency engages 9 after travel of the belt member the distance required for general braking which brings axle 2 upward, the axle 3 in turn is brought in outward position similar to axle 2. Application of power to bumper 35 causes link 8 to actuate rod 9 and move axle 3 upwardly or to the position opposite that illustrated in Figure 2.

When axle 3 is up, axle 2 moves from its upward position backward to the opposite side and this movement causes spring 7 to collapse and permits excess movement or travel to rear without excess strain on the conventional braking means now in use.

The lever 19 is movable and controls operation of disc 10 and its operation is dependent on the shoe 14 which forms contact with it to cause movement of disc 10.

The foot pedal 20 actuates lever 19 and arranged on lever 19 is an extension 21 to permit action of leverage for spring 22 to return lever 19 to normal position and the spring 22 is of sufficient strength for its purpose while the extension 23 is to form sufficient leverage to cause spring 24 to return disc 10 to position. In order to hold foot 14 against recesses 11, 12 to move disc 10 I provide the spring 25, while 26 is the contact end of an engaging member 27 and acts to hold disc 10 at 13 until change is made for emergency braking.

The engaging arc 27 acts when lever 31 is moved and is journaled at 28 and is tensioned by spring 32. The member 27 is pivoted to support 29 and is also pivoted at 30 as shown.

The bracket 29 is secured to the base 34 and the spring 32 returns member 26 to engage disc 10 at 13 as illustrated.

As shown in Figure 3, I provide a frame 34 having a slot 33 to confine the lever 19 on forward and rear movement thereof, while at the rear of frame 34 is a plate 36 as illustrated.

The invention is extremely simple in construction and operation and comprises no delicate parts such as are liable to become inoperative after a short period of use and I reserve to myself the right to make such changes or modification in the future practice of the invention as fairly fall within the scope of my appended claims.

Moreover, my operating means may be used with any form of brake mechanism or with a drag construction of braking device if desired.

Having described my invention, what I claim and desire to secure by Letters-Patent is:—

1. In brake mechanism, the combination of a main axle, a disk secured to the axle and having an offset on one edge thereof and a channel adjacent the offset, a crank secured to one end of the axle and adapted to co-act with the emergency braking mechanism of a vehicle, a crank secured to the axle adjacent the first crank, a foot pedal arranged above the axle, a lever actuable by the foot lever and having an extension thereon, a shoe adapted to travel into and out of the channel of the disc, a contact member adapted to engage a portion of the disc and means for confining the movement of the lever, and a spring backed member for limiting to a certain degree the forward movement of the lever.

2. In brake operating mechanism, the combination of an axle, cranks secured to the axle; one of said cranks adapted to actuate emergency brake mechanism and the other adapted to actuate ordinary brake mechanism, a disk secured to the axle having a channel formed in one edge, a projection formed in the disk, a member adapted to contact the projection at certain times, a foot pedal, a lever actuable by the pedal, and means secured on the lever for restraining movement of the disc.

3. In means for actuating and controlling the brake mechanism of a vehicle, the combination of an axle, a disc secured on the axle, and having a channel and projection thereon, a pedal arranged on the axle, a lever movable by the pedal, an arm fulcrumed to the lever, a contact arm adapted to engage a portion of the disc, a shoe secured on the lever and adapted to travel in the channel of the disc and means for limiting movement of the lever in one direction and means for returning the contact means and lever to normal postions.

4. In means for actuating braking mechanism of a vehicle, the combination of an axle, cranks secured to and actuable with the axle; said cranks being set at different positions on the axle, a disc arranged on and actuable with the axle, means for actuating the disc and means for limiting the movement of the disc actuating means.

5. In means for operating the brake mechanism of a vehicle, the combination of an axle, a crank secured to the axle, a second crank secured to the axle, a disc secured to the axle, a shoe adapted to bear on the disc, a contact arm adapted to bear on the disc and a lever secured to the shoe and means for limiting the movement of the lever and comprising a casing, a slot arranged in the casing, and a spring-backed plate mounted in the casing, whereby forward movement of the lever will be interrupted unless extreme pressure is exerted on the lever to overcome the pressure of the spring.

In testimony whereof I have hereunto set my hand in presence of two subscribing witnesses.

THOMAS W. GOREAU.

Witnesses:
C. H. CHURCHILL,
T. S. LEWIS.